United States Patent [19]

Tsukui et al.

[11] 4,393,956

[45] Jul. 19, 1983

[54] DRAINING DEVICE USED IN A CAR-MUFFLER

[75] Inventors: Minoru Tsukui; Hiroshi Sekiguchi, both of Ohta; Takatoshi Machida, Ashikaga, all of Japan

[73] Assignee: Fuji Jukogyo Kabushiki Kaisha, Tokyo, Japan

[21] Appl. No.: 366,442

[22] Filed: Apr. 7, 1982

[30] Foreign Application Priority Data

Apr. 8, 1981 [JP] Japan .................... 56-50564[U]

[51] Int. Cl.³ .................................................. F01N 1/08
[52] U.S. Cl. ..................................... 181/265; 181/260
[58] Field of Search ............... 181/211, 233, 235, 260, 181/261, 272, 265, 266

[56] References Cited

U.S. PATENT DOCUMENTS 3,177,971 4/1965 Kelly .................................. 181/260
3,741,336 6/1973 Malosh ............................... 181/266

Primary Examiner—Benjamin R. Fuller
Attorney, Agent, or Firm—Martin A. Farber

[57] ABSTRACT

A draining device used in a car muffler includes a muffler body separated into three compartments A, B and C with water passing holes disposed to their bottoms, an inlet pipe communicated to the compartment B, two intermediary pipes used to communicate the exhaust gas between the compartments B and C, and C and A, an outlet pipe communicating with the compartment A which is disposed at the front side of the muffler, and a water drain path having inlet port opened to the bottom of the front side compartment A and outlet port opened to the surrounding portion of the outlet pipe.

4 Claims, 6 Drawing Figures

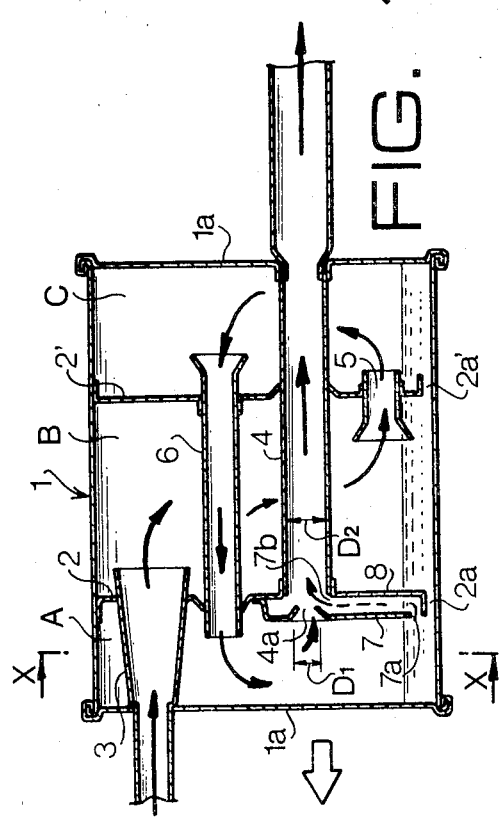
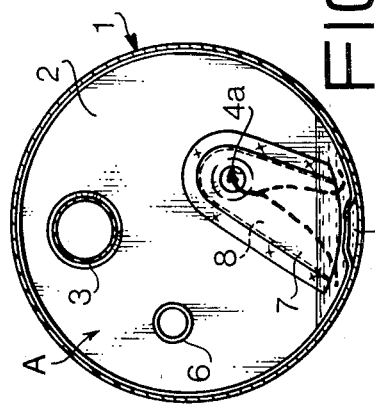
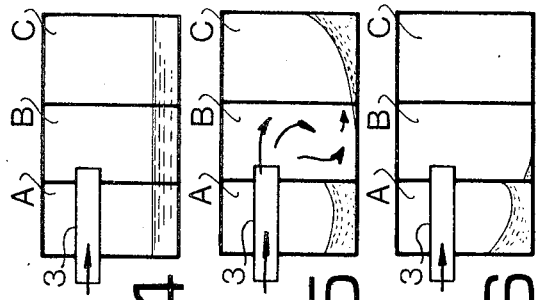
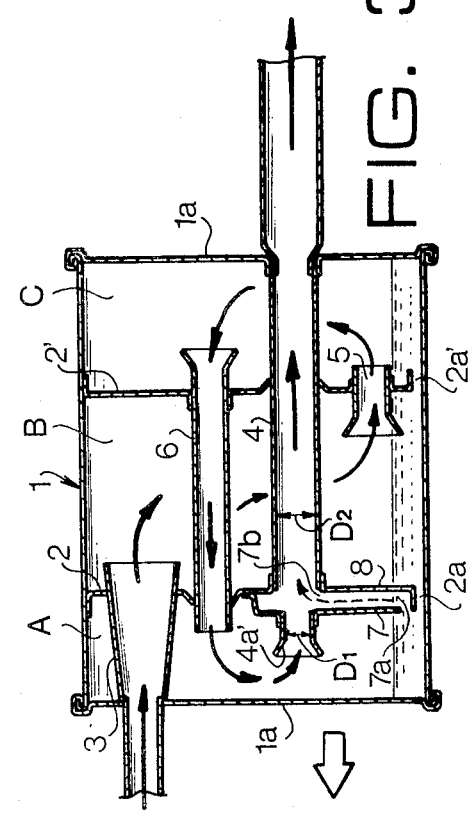

DRAINING DEVICE USED IN A CAR-MUFFLER

BACKGROUND OF THE INVENTION

The present invention relates to a draining device used in a car-muffler.

The prior car-muffler includes a hollow cylinder body having a plurality of compartments separated by means of partition plates, an inlet pipe inserted into the front-side compartment, and an outlet pipe inserted into the rear-side compartment, the compartments being communicated with each other by suitable means of penetration, whereby the exhaust gas taken through the inlet pipe in the muffler body is orderly passed through the compartments with its pressure and temperature being decreased and finally released through the outlet pipe to the atmosphere.

In this case, some problems exist that the water contents included in the exhaust gas are condensed in the compartments and the rainwater is introduced into the compartments through the outlet pipe, causing the water to be accumulated in the bottom of the muffler body resulting in corrosion of the muffler, and the engine starting is impossible due to the drain water freezed in the exhaust path formed in the muffler while vehicle is parked in the cold weather.

SUMMARY OF THE INVENTION

An object of this invention is to provide a draining device used in a car-muffler so improved as to rapidly and completely release the drain water staying in the muffler body.

The other objects and features of this invention will be apparently understood from the following description with reference to the accompanying drawings hereinafter.

BRIEF DESCRIPTION OF DRAWINGS

FIG. 1 is a vertical cross-section of a car-muffler including a draining device embodying this invention;

FIG. 2 is a cross-section of the car-muffler indicated along a line X—X in FIG. 1;

FIG. 3 is a vertical cross-section of a car-muffler including a draining device of another embodiment; and FIGS. 4 to 6 are diagramatical cross-sections of the car-muffler illustrated in a principle introducing this invention.

DETAILED DESCRIPTION OF PREFERRED EMBODIMENTS

FIGS. 1 and 2 indicates a car-muffler including a draining device embodying this invention. The car-muffler with the draining device includes a car-muffler body 1 formed into a hollow cylinder having blind plates 1a attached to both ends; two partition plates 2, 2' dividing the interior of the muffler into three compartments A, B and C; an inlet pipe 3 penetrating through the partition plate 2 and the front one of the blind plates 1a so as to communicate with the compartment B; and outlet pipe 4 penetrating through the partition plates 2 and 2', and the rear one of the blind plates 1a so as to communicate with the compartment A; a first intermediary pipe 5 penetrating the partition plate 2' so as to communicate between the compartments B and C; and a second intermediary pipe 6 penetrating the partition plates 2 and 2' so as to communicate between the compartments A and C.

The partition plates 2 and 2' have water passing holes 2a and 2a' respectively formed to the lower portions thereof near the bottom of the muffler body 1. In this invention, there is provided a water duct member 7 formed into a U-shaped cross-section and attached to the wall of the partition plate 2 in the compartment A so as to form a water drain path 8 and having an inlet port 7a opened at a lower portion near the bottom of the muffler body 1, and an outlet port 7b opened to the surrounding portion of the intermediary pipe 6 disposed in the compartment A.

In this embodiment, the inner end of the outlet pipe 4 has an opening 4a with a diameter D1 smaller than that D2 of the outlet pipe 4, and formed to the wall of the water duct member 7.

FIG. 3 indicates another embodiment of this invention wherein the opening 4a is provided with an elongated pipe protruded to the compartment A and having a diameter D1 smaller than that D2 of the outlet pipe 4.

The conception of this invention is introduced from a phenomenon which generally occurs in the car-muffler. Namely, since the car-muffler has a plurality of compartments A, B and C divided by means of partition plates with the compartments being communicated with each other at their bottoms by means of the water passing holes, the compartments A, B and C keep the same water-level as to each other as shown in FIG. 4, when the car has not been driven and has been driven in a constant velocity. Nevertheless, the water in the compartment B is transported to the compartments A and C through the water passing holes due to the pressure of the exhaust gas introduced from the inlet pipe to the compartment B as shown in FIG. 5, when the car is being started or driven under the increment of the velocity. In this case, it is already checked up on such matter that the water in the compartment A should not be transported to the compartment B by its inertia in many experiments, because such transport is prevented by the exhaust gas pressure in the compartment B.

Finally, when the car is being driven under the decrease of the velocity, the water in the compartments B and C should be transported to the compartment A through the water passing holes by its inertia as shown in FIG. 6, because of the low pressure of the exhaust gas in the compartment B.

Upon a new recognition, the inventors can introduce a draining device constructed as mentioned above. Namely, any movement of water in the compartments A, B and C under all driving conditions of the car indicates an advantage for draining water in the fact that the compartment A always keeps the water and should get the water from the other compartments B and C in the case in which the exhaust gas via the inlet pipe is supplied to the compartment B, whereby the water-drain path should be communicated with the compartment A disposed to the most front side.

In operation of this invention, when the car is driven, the exhaust gas is introduced via the inlet pipe 3 into the compartment B and transported through the intermediary pipe 5 to the compartment C, and then through the intermediary pipe 6 to the compartment A. Finally the exhaust gas in the compartment A is released through the outlet pipe 4 to the atmosphere.

The pressure of the exhaust gas is increased when the car-engine is acclerated, so that the water condensed and accumulated in the bottom of the compartment B is transported to the compartments A and C as already explained in detail.

The pressure of the exhaust gas is decreased or disappeared when the car-engine is in idling condition or stopped so that the water condensed and accumulated in the bottoms of the compartments B and C is transported to the compartment A by its inertia as the car velocity is decreased. The water in the compartment A is sucked up by the dynamic pressure of exhaust gas flew through the outlet pipe 4 as known in an ejecting effect, and is released together with the exhaust gas to the atmosphere. Namely, since the water drain path 8 is disposed in the compartment A positioned at the most front side of the muffler and has an inlet port opened to the bottom of the compartment A, the water can be completely released from all the compartments A, B and C while the car is driven. Such fact is the resultant evasion to the corrosion of the muffler material.

What is claimed is:

1. A draining device used in a car-muffler characterized by comprising a hollow cylindrical muffler body having a plurality of compartments separated by means of partition plates with they having water passing holes disposed to their bottoms, and inlet pipe for exhaust gas communicated to one of the compartments except of that positioned in the front side of the muffler, some intermediary pipes used to communicate the exhaust gas between the compartments, an outlet pipe communicating with the front side compartment, and a water drain path having an inlet port opened to the bottom of the front side compartment and an outlet port opened to the surrounding portion of the outlet pipe.

2. A draining device used in a car-muffler claimed in claim 1 in which the water drain path consists of a water duct member having a U-shaped cross section and attached to the wall of the partition plate in the front side compartment, the inlet of the outlet pipe is formed to the water duct member.

3. A draining device used in a car-muffler claimed in claim 1 in which the water drain path consists of a water duct member having a U-shaped cross-section and attached to the wall of the partition plate in the front side compartment, the inlet of the outlet pipe consists of an elongated pipe protruded from the water duct member to the interior of the front side compartment.

4. A draining device used in a car-muffler claimed in claim 2 or 3 in which the inlet of the outlet pipe has a diameter smaller than that of the outlet pipe.

* * * * *